US008720820B2

(12) United States Patent
Wilcynski

(10) Patent No.: US 8,720,820 B2
(45) Date of Patent: May 13, 2014

(54) AIRCRAFT HAVING MULTIPLE SEATING CONFIGURATIONS AND ASSOCIATED SYSTEMS AND METHODS

(75) Inventor: Paul J. Wilcynski, Seattle, WA (US)

(73) Assignee: The Boeing Company, Chicago, IL (US)

( * ) Notice: Subject to any disclaimer, the term of this patent is extended or adjusted under 35 U.S.C. 154(b) by 1189 days.

(21) Appl. No.: 11/767,790

(22) Filed: Jun. 25, 2007

(65) Prior Publication Data

US 2008/0315036 A1 Dec. 25, 2008

(51) Int. Cl.
*B64D 13/00* (2006.01)
*B64D 11/06* (2006.01)

(52) U.S. Cl.
USPC ............... 244/118.6; 244/118.1; 244/118.5

(58) Field of Classification Search
USPC ................. 244/118.1, 118.5, 118.6
See application file for complete search history.

(56) References Cited

U.S. PATENT DOCUMENTS

| | | | | |
|---|---|---|---|---|
| 4,646,993 | A * | 3/1987 | Baetke | 244/117 R |
| 4,799,631 | A * | 1/1989 | Humphries et al. | 244/118.5 |
| 4,936,620 | A * | 6/1990 | Francois et al. | 296/64 |
| 5,104,065 | A * | 4/1992 | Daharsh et al. | 244/118.6 |
| 5,131,607 | A * | 7/1992 | Arnold et al. | 244/118.6 |
| 5,178,345 | A * | 1/1993 | Peltola et al. | 244/118.6 |
| 5,180,120 | A | 1/1993 | Simpson et al. | |
| 5,193,765 | A | 3/1993 | Simpson et al. | |
| 6,012,679 | A * | 1/2000 | Auestad | 244/118.6 |
| 6,152,400 | A * | 11/2000 | Sankrithi et al. | 244/118.5 |
| 6,471,158 | B1 * | 10/2002 | Davis | 244/8 |
| 6,547,184 | B2 * | 4/2003 | Nieberle | 244/119 |
| 6,739,552 | B2 * | 5/2004 | Sankrithi et al. | 244/118.6 |
| 6,805,322 | B2 | 10/2004 | Schmidt | |
| 6,834,833 | B2 | 12/2004 | Sankrithi | |
| 6,913,227 | B1 | 7/2005 | Mahmulyin | |
| 2005/0178906 | A1 * | 8/2005 | Brauer et al. | 244/118.5 |
| 2006/0102785 | A1 * | 5/2006 | Butt | 244/118.6 |
| 2006/0237585 | A1 | 10/2006 | Lau et al. | |

OTHER PUBLICATIONS

Interior Arrangement 767 Economy; 1 page.
Seating Cross Section 737NG Economy; 1 page.
Seating Cross Section 777 Economy; 1 page.
AirFrance—Corporate, "Key figures," http://corporate.airfrance.com/en/fleet/medium-haul-fleet/, accessed Jan. 8, 2010, 1 page.

* cited by examiner

*Primary Examiner* — Philip J Bonzell
(74) *Attorney, Agent, or Firm* — Perkins Coie LLP

(57) ABSTRACT

Aircraft having multiple seating configurations and associated systems and methods are disclosed. An aircraft in accordance with one embodiment, for example, can include a fuselage having a generally circular cross-sectional shape and one or more passenger cabin portions. The individual cabin portions can include a floor connected to the fuselage and a plurality of passenger seats attached to the floor. The passenger seats are in a configuration selected from a first twin aisle seat-row arrangement and a second, single aisle seat-row arrangement. Each of the first and second seat-row arrangements is implementable in the fuselage. Further, the seats in either the first seat-row arrangement or the second seat-row arrangement have between a three abreast and a six abreast seating configuration.

21 Claims, 5 Drawing Sheets

AIRCRAFT HAVING MULTIPLE SEATING CONFIGURATIONS AND ASSOCIATED SYSTEMS AND METHODS

TECHNICAL FIELD

The following disclosure relates generally to aircraft having multiple seating configurations and, more particularly, to aircraft having single aisle and twin aisle seating configurations.

BACKGROUND

Aircraft fuselages have to satisfy a number of criteria. A fuselage design, for example, has to take into account the corresponding aircraft's structural and performance requirements, as well as the aircraft's functional requirements. Moreover, the fuselage should be designed such that the respective aircraft can meet both current and future commercial and regulatory requirements. Aircraft designers accordingly have to balance all of these considerations when designing a particular aircraft.

An aircraft's internal cabin configuration is directly related to the configuration of the aircraft's fuselage. For example, commercial aircraft typically have multiple cabins configured to carry passengers and/or cargo. The fuselage configuration (e.g., cross-sectional dimension, length, etc.) of such aircraft directly affects the passenger seating arrangement and cargo hold arrangement within the aircraft. Many smaller commercial aircraft (e.g., Boeing 737s), for example, typically have a single aisle seating arrangement including (a) a business class or first class passenger cabin with a 2-2 seat-row arrangement (two seats on each side of the aisle), and (b) an economy class passenger cabin with a 3-3 seat-row arrangement (three seats on each side of the aisle). Larger commercial aircraft (e.g., Boeing 767s, Boeing 777s) typically include two aisle seating arrangements with various suitable seat-row arrangements. For example, a business class or first class passenger cabin typically will have a 2-2-2 seat-row arrangement, with two outboard seats on the left side of the fuselage, two center seats between the two aisles, and two outboard seats on the right side of the fuselage. The same aircraft also often has an economy class passenger cabin with a 2-4-2 seat-row arrangement, with two left outboard seats, four center seats between the aisles, and two right outboard seats.

Although many current cabin configurations are sufficient to help commercial operators realize adequate revenues while providing a suitable level of passenger comfort, there is a continuing need to improve aircraft efficiency and provide passengers an enhanced level of comfort and service. Moreover, there is a continuing need to provide cabin configurations that can be easily adapted and/or reconfigured to meet both present and future needs.

SUMMARY

The present disclosure describes aircraft having multiple seating configurations and associated systems and methods. An aircraft in accordance with one embodiment, for example, can include a fuselage having a generally circular cross-sectional shape and one or more passenger cabin portions. The individual cabin portions can include a floor connected to the fuselage and a plurality of passenger seats attached to the floor. The passenger seats are in a configuration selected from a first twin aisle seat-row arrangement and a second, single aisle seat-row arrangement. Each of the first and second seat-row arrangements is implementable in the fuselage. Further, the seats in either the first seat-row arrangement or the second seat-row arrangement have between a three abreast and a six abreast seating configuration.

Another aspect of the disclosure is directed to methods for configuring an interior of an aircraft. A method in accordance with one embodiment, for example, can include installing a plurality of first passenger seats to a floor in a first fuselage portion. The first fuselage portion has a generally circular cross-sectional profile and a lateral seating envelope dimension of about 158 inches. The first seats can be installed in the first fuselage portion in a first, single aisle seat-row arrangement. The method further includes installing a plurality of second passenger seats to a floor in a second fuselage portion. The second fuselage portion has a generally identical cross-sectional profile and lateral seating envelope dimension as the first fuselage portion. The second seats can be installed in the second fuselage portion in a second, twin aisle seat-row arrangement. In one embodiment, the first and second fuselage portions are part of the same aircraft. In other embodiment, however, the first and second fuselage portions are in different aircraft.

DETAILED DESCRIPTION

The present disclosure describes aircraft having multiple seating configurations and associated systems and methods. Several specific details are set forth in the following description and in FIGS. 1-5B to provide a thorough understanding of certain embodiments. Other details describing well-known structures and systems often associated with aircraft and, more specifically, with aircraft fuselages, passenger seats, and associated systems and structures are not set forth in the following description to avoid unnecessarily obscuring the description of the various embodiments of the invention. Many of the details, dimensions, and other specifications shown in the FIGS. are merely illustrative of particular embodiments. Accordingly, other embodiments can have other details, dimensions, and specifications without departing from the spirit or scope of the present invention. In addition, other embodiments may be practiced without several of the details described below.

Figure 1:
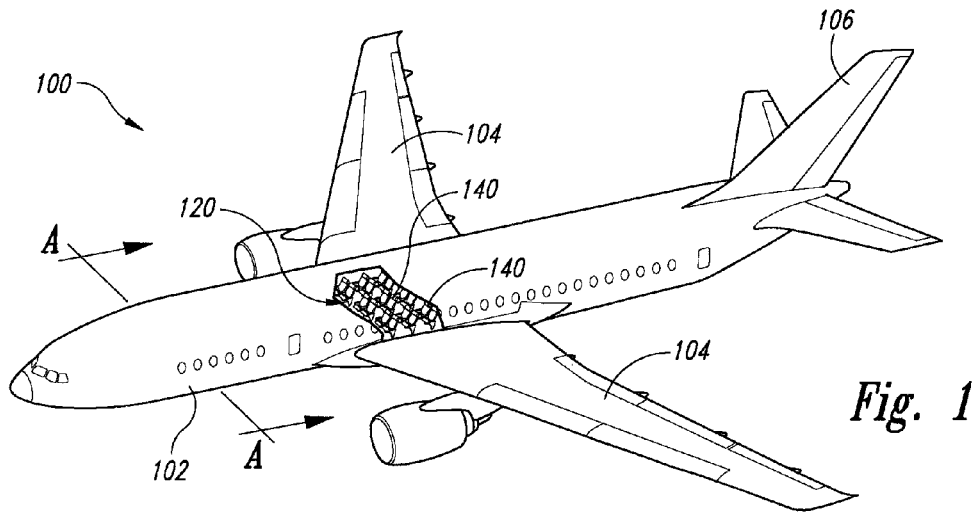
FIG. 1 is a top isometric view of an aircraft with a portion of a fuselage shown broken away and illustrating a cabin configured in accordance with one embodiment of the present invention.

FIG. 1 is a top isometric view of an aircraft 100 including a fuselage 102 (shown partially cut away), wings 104 attached to the fuselage 102, and a tail 106 also attached to the fuselage 102. The fuselage 102 includes at least one cabin configured to carry passengers and/or cargo. In the illustrated embodiment, for example, the fuselage 102 includes a passenger cabin 120 with a plurality of passenger seats 140 arranged in a selected configuration and a cargo hold or compartment (not shown) configured to carry one or more cargo containers or units. As described in detail below with reference to FIGS. 2-5B, the fuselage 102 is configured such that the passenger seats 140 can be arranged in (a) a twin aisle configuration while maintaining current comfort standards (e.g., seat bottom widths of at least about 17.2 inches) and aisles sized to provide clear pathways (e.g., at least about 18 inches) extending longitudinally through the passenger cabin 120, (b) a single aisle configuration with significantly wider aisles and seats (e.g., seat widths of at least about 19 inches and an aisle width of at least about 20 inches), and/or (c) a variety of other suitable single or twin aisle configurations. In any of the embodiments described herein, there are no more than six abreast in a particular seat-row configuration. The aircraft 100 may have the same seat-row configuration throughout, or it may include two or more different configuration in different passenger cabins (e.g., one configuration in a first class passenger cabin and a second, different configuration in an economy passenger class).

Figure 2:
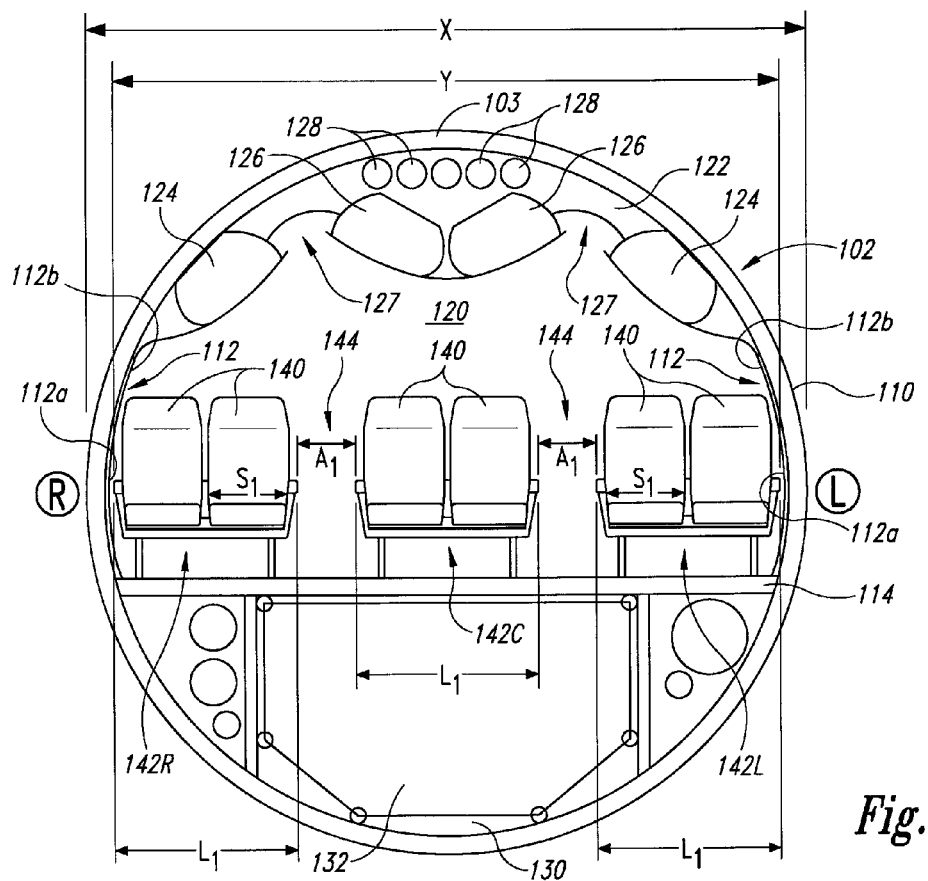
FIG. 2 is a cross-sectional view of the fuselage taken substantially along line A-A of FIG. 1.

FIG. 2 is a cross-sectional view of the fuselage 102 taken substantially along line A-A of FIG. 1. The fuselage 102 includes an outer or exterior surface 110 and inner or side walls 112. The fuselage 102 also includes a floor structure or deck 114 attached to at least one of the outer surface 110 and inner walls 112, and extending generally transverse to a longitudinal axis of the fuselage 102. The inner walls 112 and floor 114 define, at least in part, the passenger cabin 120 and a cargo hold or compartment 130.

The inner walls 112 of the fuselage 102 include first portions 112a outboard of the seats 140 and second, generally curved portions 112b that extend upward to a ceiling panel or system 122. The ceiling panel 122 can include (a) a plurality of outboard stowage bins or racks 124 proximate to the corresponding second inner wall portions 112b, and (b) one or more center stowage bins or racks 126 proximate to a center line 103 of the fuselage 102. The stowage bins 124 and 126 are pivotably movable from an up or closed position to a down or open position for loading and unloading of luggage or other articles. The outboard stowage bins 124 are laterally spaced apart from the center stowage bins 126 to define overhead aisles 127 generally aligned with the corresponding seat aisles. The overhead aisles 127 are sized to provide adequate space for passenger ingress and egress along the seat aisles without overhead interference. Further, the overhead aisles 127 are sized to allow enough space for movement of luggage or other articles into or out of the stowage bins 124 and 126. In several embodiments, the stowage bins 124 and 126 can include modular, reconfigurable systems that can be easily and economically reconfigured to provide different stowage bin arrangements to best accommodate different seating arrangements.

The ceiling panel 122 can also include conduits or duct portions 128 configured to carry or receive support lines for a variety of different aircraft systems (e.g., air, water, hydraulic, electrical, etc.) and/or passenger systems (e.g., individual seat lighting, air nozzles, etc.). The conduits 128 can be arranged within the ceiling panel 122 such that they do not have to be moved or reconfigured if the seat-row arrangement in the passenger cabin 120 changes. For example, as described below with reference to FIGS. 3-5B, the configuration of the conduits 128 remains generally the same regardless of the particular seat-row arrangement. One advantage of this feature is that the passenger cabin(s) can be easily and economically reconfigured without affecting the existing aircraft and/or passenger systems.

The fuselage 102 has a generally arcuate or circular cross-sectional profile with an external cross-sectional dimension X of about 171 inches. The generally circular cross-sectional profile is typically the most efficient shape for pressure vessels, such as fuselages. The fuselage 102 also has a maximum seating envelope or "armrest to armrest" dimension Y of about 158 inches. The inventor in the present application has discovered that having a seating envelope dimension Y of about 158 inches provides (a) the minimum lateral dimension for a twin aisle seating arrangement at the current comfort standards (seat bottom widths of at least about 17.2 inches and aisle widths of at least about 18 inches), and (b) the maximum lateral dimension generally suitable for a single aisle aircraft configuration in light of typical performance and efficiency constraints. As used herein, the term "about" can mean both an exact value and a value having a reasonable tolerance from the exact value. In a particular embodiment, for example, the seating envelope dimension Y can have a reasonable tolerance of approximately ½ to 2 inches. In still other embodiments, a reasonable tolerance for a particular dimension can be determined by a person of ordinary skill in the art.

The external cross-sectional dimension X is sized, at least in part, to accommodate the corresponding seating envelope dimension Y. For example, many commercial aircraft currently include fuselage walls having a thickness of about 6 inches and about a ½ inch gap between the inner walls 112 and the corresponding outboard portions of the passenger seats 140. Accordingly, based on the embodiment illustrated in FIG. 2, the calculation is as follows: Seating envelope of about 158 inches+Total fuselage wall thickness of about 12 inches+Gaps between the outboard seats and corresponding inner wall portions of about 1 inch=Total external cross-sectional dimension of about 171 inches. In other embodiments, the dimensions can vary. For example, the external cross-sectional dimension X can vary from about 162 inches to about 180 inches. Future aircraft may include fuselages having walls considerably thinner than current fuselage configurations and, accordingly, the total external cross-sectional dimension may be less, while still providing sufficient clearance for the corresponding seating envelope dimension Y.

The passenger seats 140 are removably attached to the floor 114 in a selected seating configuration. In the embodiment illustrated in FIG. 2, for example, the passenger seats 140 are arranged in a 2-2-2 seat-row arrangement with (a) a first or left outboard seating unit 142L adjacent to the first inner wall portion 112a on the left side of the fuselage 102, (b) a second or right seating unit 142R adjacent to the first inner wall portion 112a on the right side of the fuselage 102, and (c) a center seating unit 142C between the left and right outboard seating units 142L and 142R. The individual seating units 142L/142C/142R are spaced apart from each other to define two aisles 144 that extend longitudinally through at least a portion of the passenger cabin 120.

The individual seating units 142L/142C/142R have a lateral dimension $L_1$ of about 40.4 inches, and the individual seats 140 have seat bottom widths $S_1$ of about 17.2 inches. The aisles 144 each have a lateral dimension $A_1$ or width of about 18 inches. The illustrated seat-row arrangement accordingly has a total lateral dimension of about 157.2 inches. The 2-2-2 seat-row arrangement is a typical seating configuration for an economy class passenger cabin. In other embodiments, such as those discussed below with reference to FIGS. 3-5B, the seats 140 can be arranged in a variety of different seat-row arrangements suitable for economy, premium economy, business class, regional business class, and/or first class passenger cabins.

The fuselage 102 illustrated in FIG. 2 is also sized such that the cargo hold 130 can accommodate one or more air cargo/freight units or containers 132, such as an LD3-45 container (having a top width of about 96 inches, a bottom width of about 56.5 inches, and a length of about 55.9 inches) or other suitable cargo/freight units. In other embodiments, the cargo hold 130 can have a different configuration and/or include different features.

Figure 3:
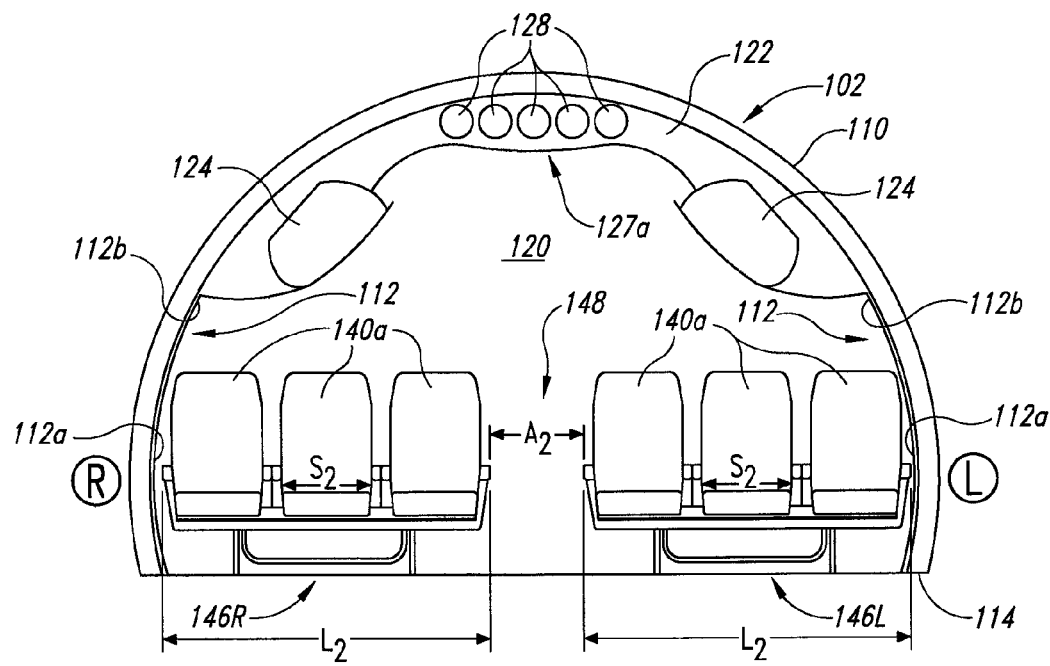
FIG. 3 is a partial cross-sectional view of the aircraft passenger cabin of FIG. 2 configured in accordance with another embodiment of the invention.

FIG. 3 is a partial cross-sectional view of the aircraft passenger cabin 120 configured in accordance with another embodiment of the invention. More specifically, a plurality of passenger seats 140a are arranged in a 3-3 seat-row arrangement with (a) a first or left side seating unit 146L, and (b) a second or right side seating unit 146R. The first and second seating units 146L/146R are spaced apart from each other by an aisle 148. The 3-3 seat-row arrangement is a typical seating configuration for a premium economy class passenger cabin, and includes wider seats and aisle than the 2-2-2 seat-row arrangement discussed above. For example, the individual seating units 146L/146R have a lateral dimension $L_2$ of about 69 inches, and the individual seats 140a have seat bottom widths $S_2$ of about 19 inches. The aisle 148 has a lateral dimension $A_2$ of about 20 inches. The illustrated 3-3 seat-row arrangement accordingly has a total lateral dimension of about 158 inches.

As mentioned above, the ceiling panel 122 can include modular, reconfigurable stowage bin systems that can be easily reconfigured to provide different stowage bin arrangements that best accommodate the cabin's particular seating arrangement. In the embodiment illustrated in FIG. 3, for example, the ceiling panel 122 only includes outboard stowage bins or racks 124 above the first and second seating units 146L/146R. The outboard stowage bins 124 are laterally spaced apart from each other to define an overhead aisle 127a generally above the aisle 148. A center stowage bin is typically not included in this configuration because it could potentially interfere with overhead aisle space for passenger ingress/egress and the loading/unloading of the outboard stowage bins 124.

One feature of the foregoing embodiments is that the seating envelope dimension Y is configured to allow both a twin aisle configuration that meets current comfort standards and a single aisle configuration that does not run afoul of typical aerodynamic and performance considerations for similarly sized aircraft. One advantage of this feature is that it provides commercial airline operators a large degree of freedom to customize seating configurations within each aircraft to meet passenger needs while enhancing revenues. For example, commercial operators must currently choose between (a) smaller, relatively efficient aircraft having a single aisle configuration, but generally slower turnaround times and less comfortable seating, or (b) larger, less efficient aircraft having a twin aisle configuration that can provide quicker turnaround times and additional passenger comfort, but may be too large to be economically feasible for particular routes. The aircraft 100 including the fuselage configuration and corresponding seating envelope described above with reference to FIGS. 1-3, however, can provide the aerodynamic efficiency associated with narrower-bodied aircraft and the operational efficiency and customer satisfaction associated with the twin aisle configurations along with larger, more comfortable seats that are currently only available in wide-bodied aircraft. The aircraft 100 is accordingly expected to enhance passenger comfort and satisfaction, as well as enhancing revenue for the commercial operators of the aircraft.

Another feature of several of the embodiments described above with reference to FIGS. 1-3 is that the aircraft 100 can include generally the same number of total passenger seats regardless of the particular seat-row configuration (2-2-2 or 3-3). For example, both the 2-2-2 configuration described above with reference to FIG. 2 and the 3-3 configuration described above with reference to FIG. 3 have a six abreast seating arrangement. Accordingly, the passenger cabin(s) in the aircraft 100 can be reconfigured between the two seat-row arrangements without a loss in total seats (and accordingly, without a potential loss in operational revenue for that particular aircraft).

FIGS. 4A-5B illustrate passenger cabins with seat-row arrangements configured in accordance with additional embodiments of the invention. The seat-row arrangements described below can be installed in one or more passenger cabins (e.g., the passenger cabin 120) of an aircraft (e.g., the aircraft 100) and include many of the features and advantages of the seat-row configurations described above with reference to FIGS. 1-3. Furthermore, although not discussed in detail below, the stowage bin systems in the respective passenger cabins can be reconfigured and/or modified as necessary based on the corresponding seating arrangements.

Figure 4A:
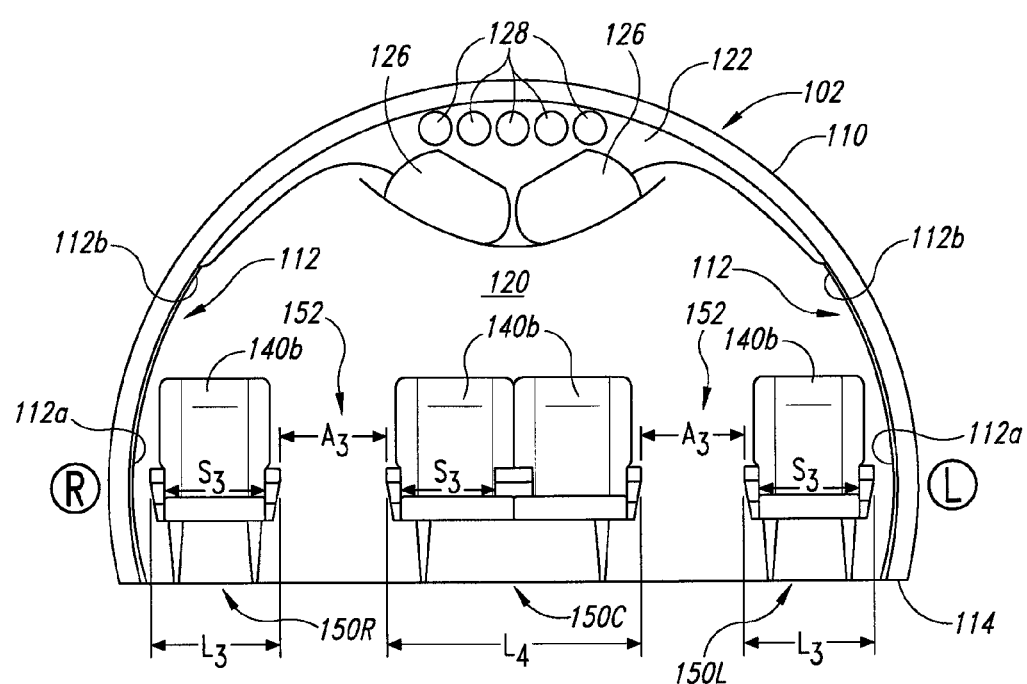
FIGS. 4A-4E are cross-sectional views of an aircraft passenger cabin having twin aisle seat-row arrangements configured in accordance with additional embodiments of the invention.

FIGS. 4A-4E, for example, are cross-sectional views of twin aisle seat-row arrangements configured in accordance with additional embodiments of the invention. Referring to FIG. 4A, a plurality of passenger seats 140b are arranged in a 1-2-1 seat-row arrangement with (a) a first or left outboard seating unit 150L adjacent to the left side of the fuselage 102, (b) a second or right seating unit 150R adjacent to the right side of the fuselage 102, and (c) a center seating unit 150C between the left and right outboard seating units 150L and 150R. The individual seating units 150L/150C/150R are spaced apart from each other to define two aisles 152 that extend longitudinally through at least a portion of the passenger cabin 120.

The first and second seating units 150L/150R have a lateral dimension $L_3$ of about 27 inches and the center seating unit 150C has a lateral dimension $L_4$ of about 54 inches. The individual seats 140b in this particular configuration have seat bottom widths $S_3$ of about 20 inches. The aisles 152 each have a lateral dimension $A_3$ of about 22 inches. The illustrated seat-row arrangement accordingly has a total lateral dimension of about 152 inches. The 1-2-1 seat-row arrangement is expected to provide the same comfort and seat dimensions as a business class passenger cabin on an international twin aisle aircraft.

Figure 4B:
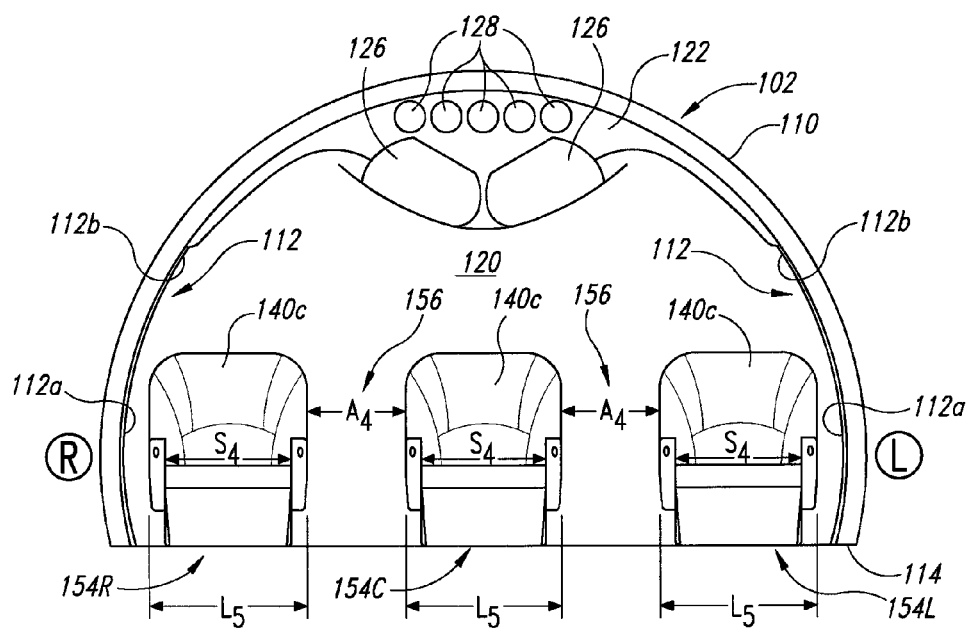

Referring next FIG. 4B, a plurality of passenger seats 140c are arranged in a 1-1-1 seat-row arrangement with three seating units 154L/154R/154C positioned at the left side, right side, and center, respectively, of the passenger cabin 120. The individual seating units 154L/154R/154C are spaced apart from each other to define two aisles 156. Each seating unit 154L/154R/154C has a lateral dimension $L_5$ of about 35 inches, and a seat bottom width $S_4$ of about 29 inches. The aisles 156 each have a lateral dimension $A_4$ of about 22 inches. The illustrated 1-1-1 seat-row arrangement accordingly has a total lateral dimension of about 149 inches. The 1-1-1 seat-row arrangement is a typical seating configuration for a first class passenger cabin.

Figure 4C:
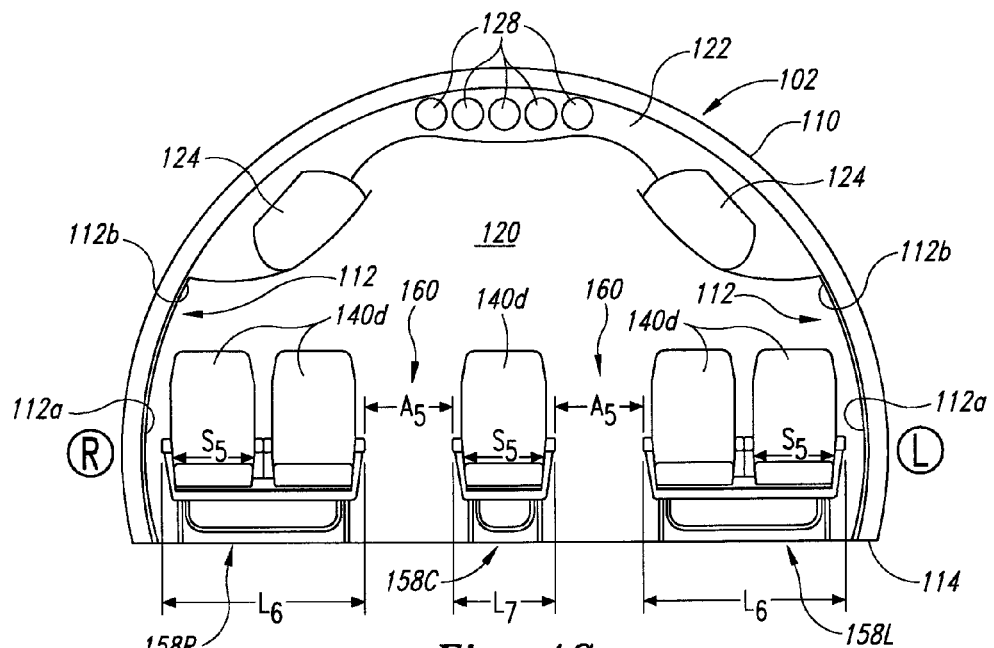
Figure 4D:
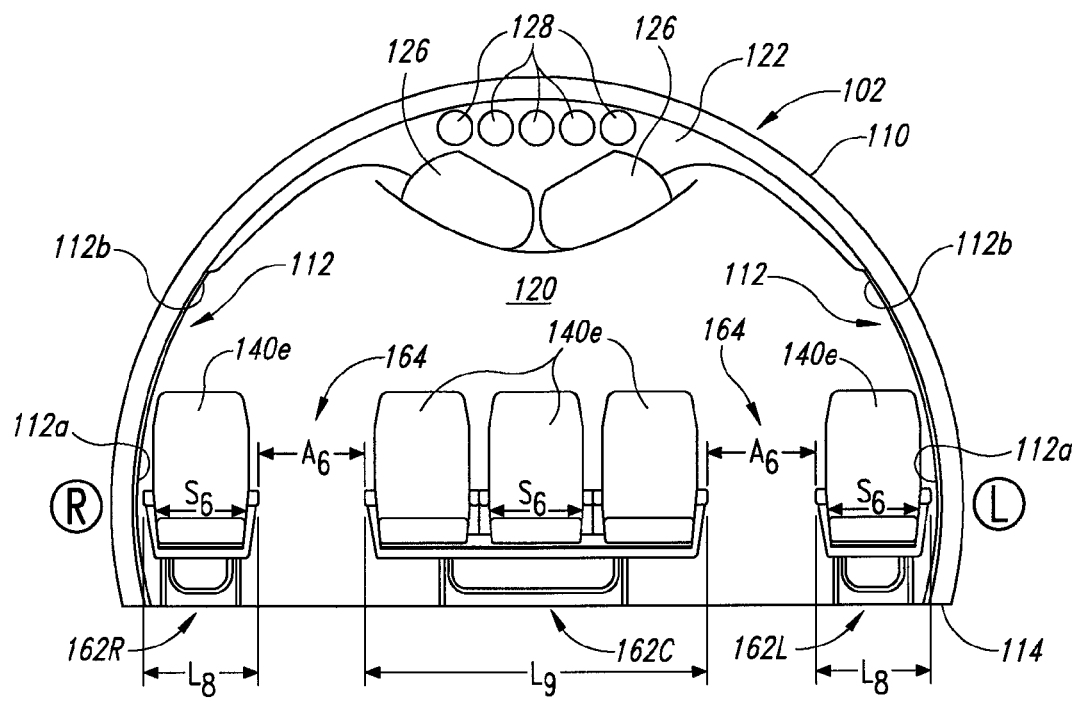

FIGS. 4C and 4D illustrate typical seating configurations for a regional business class passenger cabin. Referring first to FIG. 4C, for example, the passenger seats 140c are arranged in a 2-1-2 seat-row arrangement with (a) a first or left outboard seating unit 158L adjacent to the left side of the fuselage 102, (b) a second or right seating unit 158R adjacent to the right side of the fuselage 102, and (c) a center seating unit 158C between the left and right outboard seating units 158L and 158R. The individual seating units 158L/158C/158R are spaced apart from each other to define two aisles 160.

The first and second seating units 158L/158R have a lateral dimension $L_6$ of about 46 inches and the center seating unit 158C has a lateral dimension $L_7$ of about 23 inches. The individual seats 140c in this particular configuration have seat bottom widths $S_5$ of about 19 inches. The aisles 160 each have a lateral dimension $A_5$ of about 21.5 inches. The 2-1-2 seat-row arrangement accordingly has a total lateral dimension of about 158 inches.

One feature of the embodiments described above with reference to FIGS. 4A-4C is that the illustrated seat-row arrangements provide each passenger with a window and/or aisle seat. One advantage of this feature is that a commercial operator could have an enhanced fare structure for passenger cabins including such seating arrangements because of the desirability of window/aisle seats and the additional ease of accessibility and passenger comfort provided by such configurations.

Referring next to FIG. 4D, a plurality of passenger seats 140d are arranged in a 1-3-1 seat-row arrangement with (a) a first or left outboard seating unit 162L adjacent to the left side of the fuselage 102, (b) a second or right seating unit 162R adjacent to the right side of the fuselage 102, and (c) a center seating unit 162C between the left and right outboard seating units 162L and 162R. The individual seating units 162L/162C/162R are spaced apart from each other to define two aisles 164.

The first and second seating units 162L/162R have a lateral dimension $L_8$ of about 23 inches and the center seating unit 162C has a lateral dimension $L_9$ of about 69 inches. The individual seats 140d in this particular configuration have seat bottom widths $S_6$ of about 19 inches. The aisles 164 each have a lateral dimension $A_6$ of about 21.5 inches. The 1-3-1 seat-row arrangement of FIG. 4D accordingly has a total lateral dimension of about 158 inches.

Figure 4E:
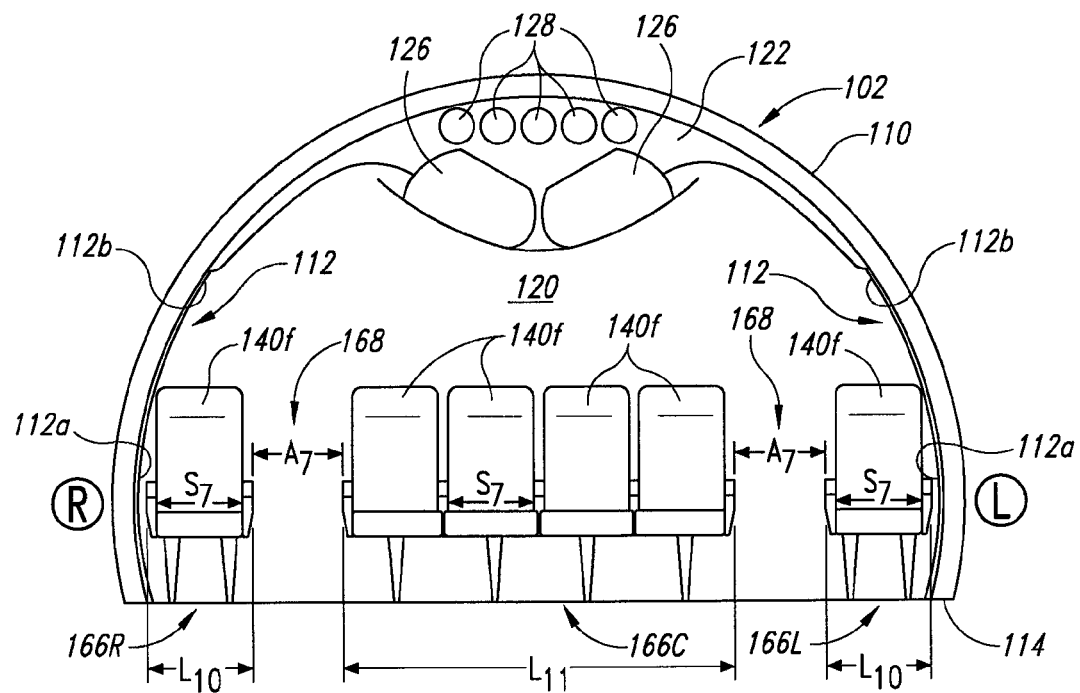

FIG. 4E illustrates another twin aisle seating configuration typically suitable for an economy class passenger cabin. In this embodiment, a plurality of passenger seats 140e are arranged in a 1-4-1 seat-row arrangement with (a) a first or left outboard seating unit 166L adjacent to the left side of the fuselage 102, (b) a second or right seating unit 166R adjacent to the right side of the fuselage 102, and (c) a center seating unit 166C between the left and right outboard seating units 166L and 166R. The individual seating units 166L/166C/166R are spaced apart from each other to define two aisles 168.

The first and second seating units 166L/166R have a lateral dimension $L_{10}$ of about 21.2 inches and the center seating unit 166C has a lateral dimension $L_{11}$ of about 78.8 inches. The individual seats 140e in this particular configuration have seat bottom widths $S_7$ of about 17.2 inches. The aisles 168 each have a lateral dimension $A_7$ of about 18 inches. The illustrated seat-row arrangement accordingly has a total lateral dimension of about 157.2 inches. One feature of this 1-4-1 seat row arrangement is that it provides six abreast seating (like the 2-2-2 or 3-3 seat-row configurations described previously) to maximize total seating on the aircraft. Furthermore, the single outboard seats in the 1-4-1 seat-row arrangement could potentially have an associated enhanced fare structure because of the desirability of a single seat adjacent to both an aisle and a window.

Figure 5A:
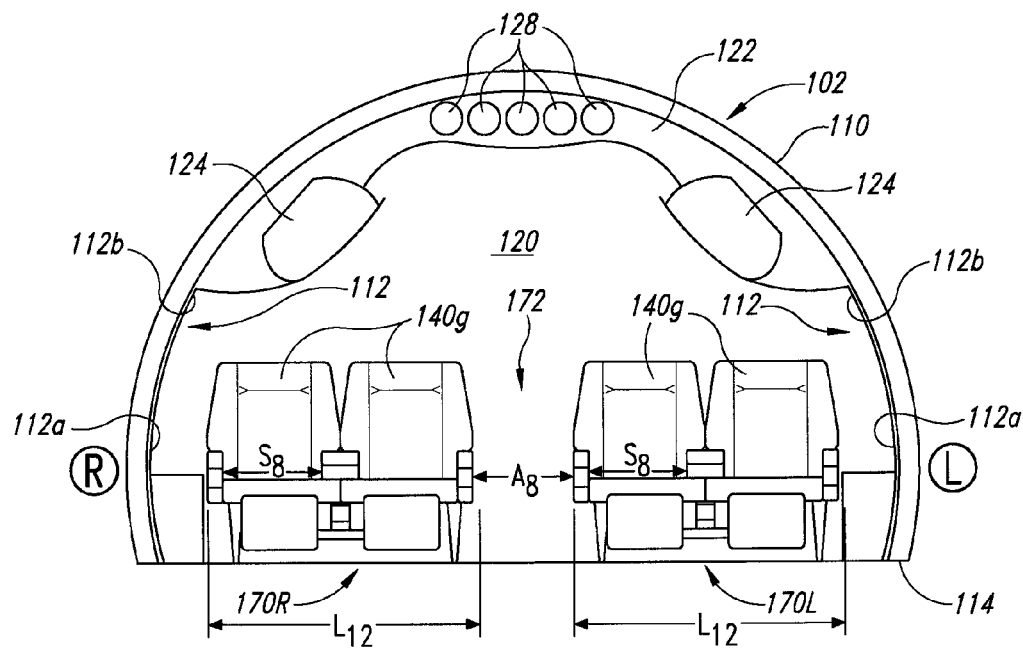
FIGS. 5A and 5B are cross-sectional views of an aircraft passenger cabin having single aisle seat-row arrangements configured in accordance with still further embodiments of the invention.
Figure 5B:
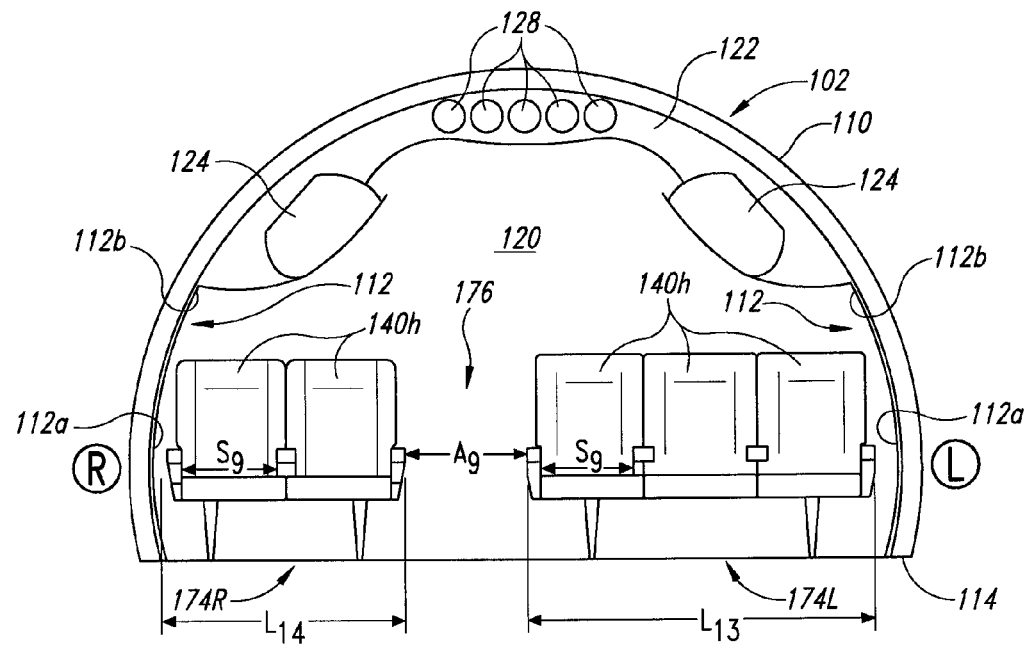

FIGS. 5A and 5B are cross-sectional views of single aisle seat-row arrangements configured in accordance with still further embodiments of the invention. Referring to FIG. 5A, for example, a plurality of passenger seats 140f are arranged in a 2-2 seat-row arrangement with (a) a first or left side seating unit 170L, and (b) a second or right side seating unit 170R. The first and second seating units 170L/170R are spaced apart from each other by an aisle 172 that extends longitudinally through at least a portion of the passenger cabin 120. The 2-2 seat-row arrangement is a typical seating configuration for a first class passenger cabin, and includes wider seats and a wider aisle than the single seat-row arrangement discussed above with reference to FIG. 3. For example, the individual seating units 170L/170R have a lateral dimension $L_{12}$ of about 57 inches, and the individual seats 140f have seat bottom widths $S_8$ of about 21 inches. The seating units 170L/170R in the illustrated embodiment also each include an outboard storage unit or stow box 173 between the respective seating unit and the fuselage 102. The aisle 172 has a lateral dimension $A_8$ of about 22 inches. The illustrated 2-2 seat-row arrangement accordingly has a total lateral dimension of about 136 inches (excluding the outboard storage units 173).

FIG. 5B illustrates a single aisle seating configuration typically suitable for regional business class passenger cabin. In this embodiment, a plurality of passenger seats 140g are arranged in a 2-3 seat-row arrangement with (a) a first or left side seating unit 174L, and (b) a second or right side seating unit 174R. The first and second seating units 174L/174R are spaced apart from each other by an aisle 176. The first seating unit 174L has a lateral dimension $L_{13}$ of about 76 inches and the second seating unit 174R has a lateral dimension $L_{14}$ of about 51 inches. The individual seats 140g in this particular configuration have seat bottom widths $S_9$ of about 19 inches. The aisle 176 has a lateral dimension $A_9$ of about 27 inches. The illustrated 2-3 seat-row arrangement accordingly has a total lateral dimension of about 154 inches. In other embodiments, the seat-row arrangement in FIG. 5B can be reversed such that is a 3-2 seat-row arrangement with the three-seat seating unit on the right side of the fuselage 102 and the two-seat seating unit on the left side of the fuselage 102.

From the foregoing, it will be appreciated that specific embodiments of the invention have been described herein for purposes of illustration, but that various modifications may be made without deviating from the invention. For example, the seat-row configurations described above may include different configurations, features, and/or dimensions. Furthermore, a number of other seat-row arrangements in addition to, or in lieu of, the various arrangements described above may be suitable in aircraft passenger cabin(s) having the desired seating envelope dimension Y (FIG. 2). Aspects of the invention described in the context of particular embodiments may be combined or eliminated in other embodiments. For example, an aircraft may include two or more different seat-row arrangements within the aircraft's passenger cabin(s). Furthermore, the seat-row arrangements described above as being typically associated with a particular passenger cabin classification (e.g., economy class, business class, first class, etc.) may be used in cabins having different classifications. Further, while advantages associated with certain embodiments of the invention have been described in the context of those embodiments, other embodiments may also exhibit such advantages, and not all embodiments need necessarily exhibit such advantages to fall within the scope of the invention. Accordingly, the invention is not limited except as by the appended claims.

I claim:

1. An aircraft system, comprising:
a fuselage having a generally circular cross-sectional shape and one or more passenger cabin portions, the individual cabin portions including—
a floor connected to the fuselage; and
a plurality of passenger seats attached to the floor in a configuration selected from a first seat-row arrangement and a second seat-row arrangement, each of which is implementable in the fuselage, wherein the first seat-row arrangement includes a twin aisle configuration and the second seat-row arrangement includes a single aisle configuration, and wherein the seats in either the first seat-row arrangement or the second seat-row arrangement have between a three abreast and a six abreast seating configuration, and
wherein the individual seat-rows in either the first seat-row arrangement or the second seat-row arrangement include a first outboard portion adjacent to an inner wall at a first side of the fuselage and a second outboard portion adjacent to an inner wall at a second, opposite side of the fuselage, and wherein the lateral distance between the first outboard portion and the second outboard portion is about, but not greater than, 158 inches.

2. The aircraft of claim 1 wherein an outer cross-sectional dimension of the fuselage is from about 171 inches to about 180 inches.

3. The aircraft of claim 1 wherein an outer cross-sectional dimension of the fuselage is about 171 inches.

4. The aircraft of claim 1 wherein:
the seats in the first seat-row arrangement have a seat bottom width of at least about 17.2 inches, and each aisle has a width of at least about 18 inches; and
the seats in the second seat-row arrangement have a seat bottom width of about 19 inches and the single aisle has a width of at least about 20 inches.

5. The aircraft claim 1 wherein:
in the first seat-row arrangement, the seats are positionable in one of a 2-2-2, 1-2-1, 1-1-1, 2-1-2, 1-3-1, and 1-4-1 seat-row arrangement; and
in the second seat-row arrangement, the seats are positionable in one of a 3-3, 2-2, 2-3, and 3-2 seat-row arrangement.

6. The aircraft of claim 1 wherein the individual cabin portions include a first quantity of seats when the seats are in the first seat-row arrangement and a second quantity of seats when the seats are in the second seat-row arrangement, and wherein the first and second quantities are the same.

7. The aircraft of claim 1 wherein the fuselage further comprises one or more cargo holds, and wherein the individual cargo holds are sized to carry an LD3-45 cargo container.

8. The aircraft of claim 1 wherein:
the fuselage has an outer cross-sectional dimension of about 171 inches;
in the first seat-row arrangement, the seats are positioned in a 2-2-2 seat-row arrangement with two aisles extending approximately parallel with a longitudinal axis of the fuselage, and wherein the seats in the first seat row arrangement have a seat bottom width of about 17.2 inches, and each aisle has a width of about 18 inches;
in the second seat row arrangement, the seats are positioned in a 3-3 seat-row arrangement with a single aisle extending approximately parallel with the longitudinal axis of the fuselage, and wherein the seats in the second seat row arrangement have a seat bottom width of about 19 inches and the single aisle has a width of about 20 inches.

9. The aircraft of claim 1 wherein in the first seat-row arrangement, the seats are positionable in a 2-2-2 seat-row arrangement having two aisles extending approximately parallel with a longitudinal axis of the fuselage, and wherein in the second seat row arrangement, the seats are positionable in a 3-3 seat-row arrangement having a single aisle extending approximately parallel with the longitudinal axis of the fuselage.

10. The aircraft of claim 9 wherein the fuselage includes a first cabin portion and a second cabin portion, and wherein the seats in the first cabin portion are arranged in the first seat-row arrangement and the seats in the second cabin portion are arranged in the second seat-row arrangement.

11. An aircraft, comprising:
a fuselage having an outer wall, an inner wall, and a generally circular cross-sectional profile, and wherein the inner cross-sectional dimension is less than about 160 inches;
a floor coupled to the fuselage, the floor being generally transverse to a longitudinal axis of the fuselage to define, at least in part, one or more passenger cabins and one or more cargo holds in the fuselage; and
a plurality of passenger seats removably coupled to the floor in one or more corresponding passenger cabins, the seats being in a six abreast seat-row configuration and reconfigurable between a single aisle arrangement and a twin aisle arrangement, and wherein in either seat-row arrangement, the individual seats have a seat bottom width of at least about 17.2 inches and the individual aisles have a width of at least about 18 inches, and
wherein the one or more passenger cabins in the fuselage have a seating envelope with a width of about, but not more than, 158 inches.

12. The aircraft of claim 11 wherein the outer cross-sectional dimension of the fuselage is from about 171 inches to about 180 inches.

13. The aircraft of claim 11 wherein:
in the single aisle arrangement, the seats are positioned in a 3-3 seat-row arrangement having a single aisle extending approximately parallel with the longitudinal axis of the fuselage; and
in the twin aisle arrangement, the seats are positioned in a 2-2-2 seat-row arrangement having two aisles extending approximately parallel with the longitudinal axis of the fuselage.

14. The aircraft of claim 13 wherein in the twin aisle arrangement, the seats are further positionable in a 1-4-1 seat row arrangement having two aisles extending approximately parallel with the longitudinal axis of the fuselage.

15. The aircraft of claim 13 wherein:
the individual seats in the 3-3 seat row arrangement have a seat bottom width of about 19 inches and the aisle has a width of about 20 inches; and
the individual seats in the 2-2-2 seat row arrangement have a seat bottom width of about 17.2 inches and each aisle has a width of about 18 inches.

16. A method of configuring an interior of an aircraft, the method comprising:
installing a plurality of first passenger seats to a floor in a first fuselage portion having a generally circular cross-sectional profile and a lateral seating envelope dimension of about, but not greater than, 158 inches, wherein the seats are installed in the first fuselage portion in a first, single aisle seat-row arrangement; and installing a plurality of second passenger seats to a floor in a second fuselage portion having a generally identical cross-sectional profile and lateral seating envelope dimension as the first fuselage portion, and wherein the seats are installed in the second fuselage portion in a second, twin aisle seat-row arrangement.

17. The method of claim 16 wherein installing a plurality of first passenger seats to a floor in a first fuselage portion having a generally circular cross-sectional profile comprises installing the first seats in a first fuselage portion having an outer cross-sectional dimension of from about 171 inches to about 180 inches.

18. The method of claim 16 wherein installing a plurality of passenger seats to a floor in a first fuselage portion having a generally circular cross-sectional profile comprises installing the seats in a first fuselage portion having an outer cross-sectional dimension of about 171 inches.

19. The method of claim 16 wherein installing a plurality of first passenger seats in a first fuselage portion and installing a plurality of second passenger seats in a second fuselage portion comprises installing the first and second seats in first and second fuselage portions, respectively, of the same aircraft.

20. The method of claim 16 wherein:
installing a plurality of first passenger seats to a floor in a first fuselage portion comprises installing first seats having a seat bottom width of about 19 inches in a 3-3 seat-row arrangement having a single aisle with a width of about 20 inches extending approximately parallel with a longitudinal axis of the fuselage; and
installing a plurality of second passenger seats to a floor in a second fuselage portion comprises installing second seats having a seat bottom width of about 17.2 inches in a 2-2-2 seat-row arrangement having two aisles extending approximately parallel with the longitudinal axis of the fuselage, the individual aisles having a width of about 18 inches.

21. The method of claim 16 wherein:
installing a plurality of first passenger seats to a floor in a first fuselage portion comprises installing the first seats in at least one of a 3-3, 2-2, 2-3, and 3-2 seat-row arrangement; and
installing a plurality of second passenger seats to a floor in a second fuselage portion comprises installing the second seats in at least one of a 2-2-2, 1-2-1, 1-1-1, 2-1-2, 1-3-1, and 1-4-1 seat row arrangement.

* * * * *